United States Patent [19]

D'Alterio

[11] Patent Number: 4,522,217

[45] Date of Patent: Jun. 11, 1985

[54] PAIRED CONVEYOR BELTS WITH ZIGZAG TRAVEL

[76] Inventor: Joseph C. D'Alterio, 64 Sugar Maple La., Glen Cove, N.Y. 11542

[21] Appl. No.: 536,704

[22] Filed: Sep. 28, 1983

[51] Int. Cl.³ .............................................. A23P 1/00
[52] U.S. Cl. .................................... 134/75; 134/25.3; 134/127; 99/405
[58] Field of Search ................ 134/75, 77, 127, 64 R, 134/64 P, 60, 15, 18, 25.3, 25.4, 32; 198/950, 837, 841; 99/404, 405

[56] References Cited

U.S. PATENT DOCUMENTS

| | | | |
|---|---|---|---|
| 2,070,210 | 2/1937 | Mason | 134/127 |
| 2,286,644 | 6/1942 | Pringle et al. | 99/404 |
| 2,905,105 | 9/1959 | Lombi | 99/404 |
| 3,282,197 | 11/1966 | Smith, Jr. | 99/405 |
| 3,599,555 | 8/1971 | Dutch | 134/75 |
| 4,268,929 | 5/1981 | Sörensen et al. | 134/64 R |
| 4,361,444 | 11/1982 | McClanahan et al. | 134/18 |
| 4,388,120 | 6/1983 | West et al. | 134/60 |

FOREIGN PATENT DOCUMENTS 620636 11/1962 Belgium .............................. 134/127

Primary Examiner—Stephen Marcus
Assistant Examiner—Renee S. Kidorf
Attorney, Agent, or Firm—Paul W. Garbo

[57] ABSTRACT

A conveyor with zigzag travel is formed by two continuous conveyor belts and is particularly useful for processing materials. Each belt has openings along its marginal portions and a set of driven belt sprockets meshing with those openings. Part of the length of each belt is maintained in parallel, spaced relation to part of the length of the other and together form a zigzag path with one or more U-turns. At each U-turn, one belt turns on sprockets and the other turns with its marginal portions sliding around curved guides. The remaining parts of the lengths of both belts are separated from one another and provide places for feeding material to, and removing it from, the conveyor.

19 Claims, 6 Drawing Figures

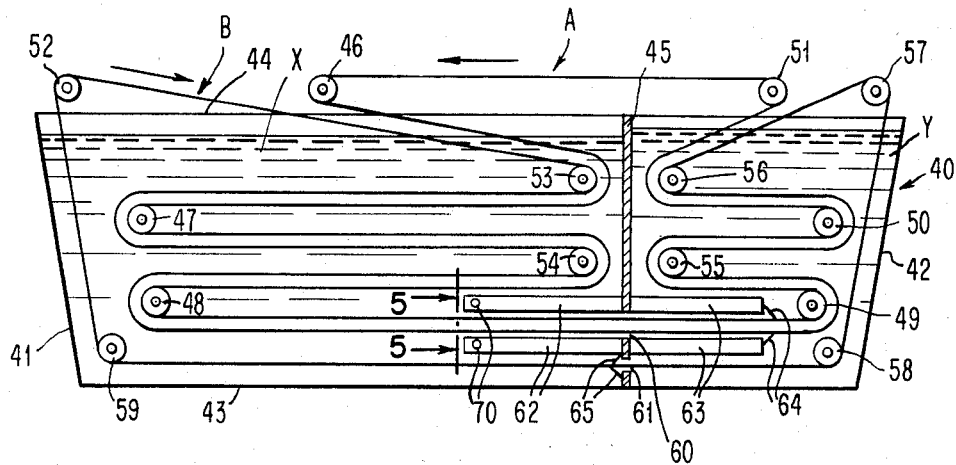
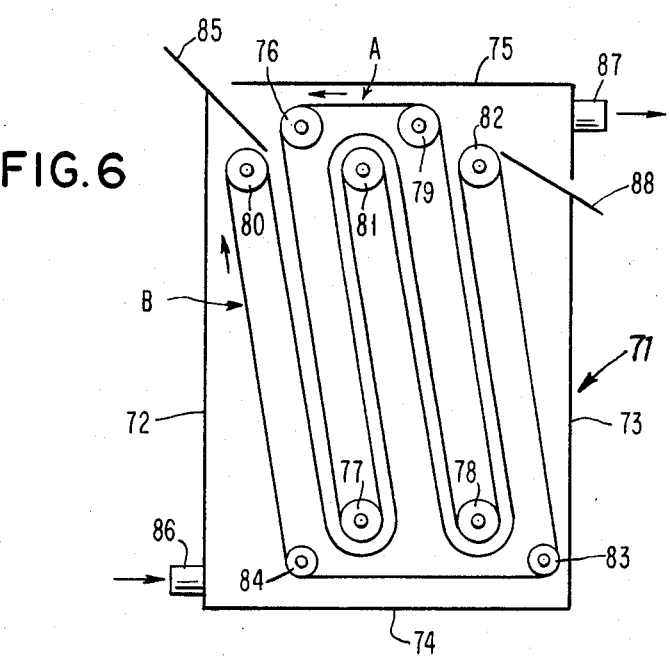

PAIRED CONVEYOR BELTS WITH ZIGZAG TRAVEL

BACKGROUND OF THE INVENTION

This invention relates to conveyors formed by a pair of spaced, substantially parallel belts, and more particularly, to such conveyors having reversed or zigzag travel.

Conveyor belts are used for two principal purposes: to transport materials from one point to a different point or to carry materials through a processing zone. The length of a conveyor is obviously fixed by the distance between the two points when the purpose of the conveyor is simply to transport material therebetween. However, when the conveyor serves to carry material through a processing zone, such as a cooking, drying, baking, frying, chilling fumigating or other treatment zone, time becomes an important factor in determining the length of the conveyor. For example, to achieve a desired processing result and at the same time to maintain a desired production rate (pounds or other units per hour) a conveyor with a length of 150 feet may be required. This conveyor not only will take up a great deal of valuable floor area in a building but worse yet will require a building having at least one dimension in excess of 150 feet. Consequently, such a long processing conveyor is burdened with high capital and overhead costs.

A principal object of this invention is to reduce the floor length requirement of a processing conveyor.

Another important object is to hold the material on the processing conveyor in place while undergoing treatment.

A further object is to turn the material on the conveyor upside down during treatment.

Other features and advantages of the invention will be apparent from the description which follows.

SUMMARY OF THE INVENTION

In accordance with this invention, a conveyor is formed by a pair of spaced, substantially parallel belts having at least one reversal or U-turn in their travel. The conveyor of this invention will generally have several U-turns so that it travels along a zigzag course.

Inasmuch as the processing or treatment of materials usually involves exposure to and contact with liquids such as hot water or oil with gases such as steam or hot air, the belts used in the conveyor of this invention are preferably perforated or reticular. Bulletin 148 of Cambridge Wire Cloth Company in Cambridge, Md., shows metal mesh belts in various weaves which are well suited for the conveyor of this invention. Wire Belt Company of America in Winchester, Mass., sells a belt under the registered trademark Flat-Flex which is formed of stainless steel wire into a mesh having roughly rectangular openings approximately 0.4 inch wide and 2 or more inches long. Flat-Flex belt is particularly preferred for many uses of the conveyor of this invention.

The inner belt at each U-turn is wrapped around a driven gear or sprocket, the teeth of which mesh with openings in the belt. Hence, the inner belt at each U-turn or reversal is positively driven. However, the outer belt at each U-turn slides around a fixed arced member or shoe which keeps the outer belt spaced from the inner belt at the U-turn the same distance that is maintained between the two belts in their straight parallel portions or stretches. Both Cambridge Wire Cloth Company and Wire Belt Company offer sprockets to mesh with their belts.

One end of each shaft on which the belt sprockets are mounted is provided with rotational drive means such as an electric motor but preferably a power sprocket with a power chain. It is essential that all the belt sprockets in the conveyor system be driven at the same rotational speed. For this reason, power sprockets with power chains forming a single power train driven by one electric motor are preferred for achieving synchronous rotation of all the belt sprockets or gears. Means for rotating several shafts in synchronism are well known and need no further explanation herein, particularly inasmuch as the drive for the shafts at the several U-turns in the paired belt conveyor is not part of this invention.

It is well to note that the inner belt driven at one U-turn becomes the outer belt sliding around the shoe of the next U-turn in the travel of the conveyor, while the outer belt sliding around the shoe of the first-mentioned U-turn becomes the inner belt driven at the second-mentioned U-turn. At each succeeding U-turn in the travel of the conveyor, the two belts will again change positions relative to the belt sprocket and shoe of the U-turn. The belt sprockets and shoes may be made of metal or plastic as known for such drive and guide means. While belt sprockets may be positioned in the central portion as well as in the marginal portions of the inner belt at a U-turn, two arced guides or shoes are positioned to contact only the two marginal portions of the outer belt so that the two shoes do not obstruct the material being carried around the U-turn by the central portion of the paired belts.

For simplicity of further description of the invention, the straight portion of the paired, spaced belts extending from one U-turn to the next U-turn will herein be referred to as a pass of the novel conveyor. Hence, the paired, spaced belts forming the conveyor with zigzag travel according to this invention may also be simply referred to as the multi-pass conveyor. Also, the portion of a single conveyor belt extending from one rotary device to another rotary device will be called a run which is a conventional term. While the multiple passes of the novel conveyor are usually horizontal, they may in some cases be vertical or at any desired angle thereto.

BRIEF DESCRIPTION OF THE DRAWINGS

For a better understanding of the invention, the further description thereof will refer to the accompanying drawings of which:

FIG. 4 is a diagrammatic side elevation of another preferred embodiment of this invention in which the zigzag travel of the paired belts passes through two contiguous processing zones;

FIG. 6 is a diagrammatic side elevation of still another embodiment of the invention in which the multiple passes of the conveyor are slightly slanted relative to the vertical.

DESCRIPTION OF PREFERRED EMBODIMENTS

Figure 1:
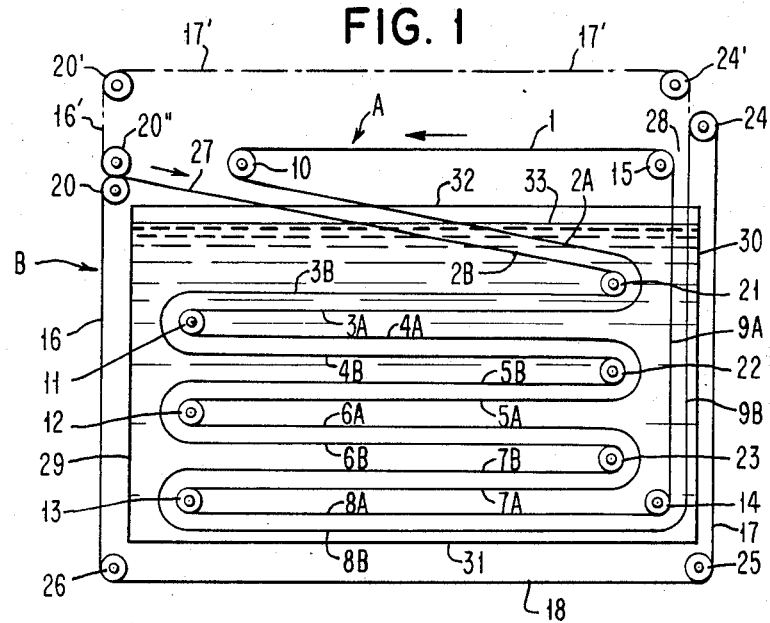
FIG. 1 is a diagrammatic side elevation of one preferred embodiment of the conveyor of this invention having a pair of substantially parallel flexible belts with a zigzag travel path.

FIG. 1 shows diagrammatically an edgewise view of one form of the conveyor of this invention formed by the pair of continuous conveyor belts A,B. Belt A has runs 1,2A,3A, 4A,5A,6A,7A,8A,9A and is moved by driven sprockets 10,11,12, 13,14,15. Belt B has runs 16,2B,3B,4B,5B,6B,7B,8B,9B,17,18 and is moved by driven sprockets 20,21,22,23,24,25,26. The paired belt runs 2A,2B are spaced from, and parallel to, each other and thus form a pass of the conveyor of this invention. Likewise, paired belt runs 3A,3B; 4A,4B; 5A,5B; 6A,6B; 7A,7B; 8A, 8B; 9A,9B form seven additional passes of the conveyor. Position 27 of belt run 2B provides the place where material is deposited for treatment while being transported by the conveyor. Sprockets 20,21 rotate clockwise so that material placed on belt run 2B at position 27 is carried under sprocket 10. Thus, the material is captured between parallel belt runs 2A,2B which travel at the same speed toward the U-turn around sprocket 21. Of course, sprocket 10 rotates counterclockwise to drive belt run 2A in the same direction of belt run 2B. In fact, all the other sprockets 11,12,13,14,15 which drive belt A also rotate counterclockwise while all the sprockets 20,21, 22,23,24,25,26 which mesh with belt B rotate clockwise.

The material to be treated which is captured between belt runs 2A,2B travels the length of a total of eight passes through the treatment zone before leaving that zone. The treated material is released by the paired belts A,B at position 28 where it is manually or mechanically removed. Although the processing zone may be of any desired type, it is shown in FIG. 1 as involving the immersion of the material to be treated in a liquid.

The liquid is held in a tank having end walls 29,30, bottom 31 and open top 32. The material placed on belt B at position 27 is carried down into the liquid bath with level 33 below top edge 32 of the tank. Belt runs 9A,9B lift the treated material out of the liquid bath to position 28 where it is removed from the system.

Figure 2:
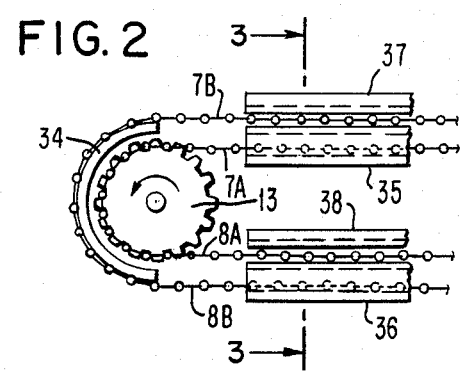
FIG. 2 is an enlarged and more detailed partial view of the conveyor at the lowest U-turn along the left portion of FIG. 1.
Figure 3:
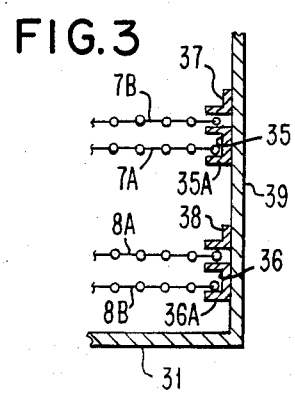
FIG. 3 is a sectional view taken along the line 3—3 of FIG. 2.

FIG. 2 and FIG. 3 show details of belt sprocket 13 and associated members of the conveyor. Inasmuch as sprocket 13 rotates counterclockwise, belt run 7A is pulled around sprocket 13 to travel in the reverse direction as belt run 8A. Simultaneously, movement of belt run 7B causes its marginal or edge portion to slide around arced shoe 34 so that belt B then also travels in the reverse direction as run 8B. Parallel spaced channels 35,36 and parallel spaced angle bars 37, 38 serve as guides to keep belts A,B apart with a uniform, desired spacing. As seen in FIG. 3, channels 35,36 and angles 37,38 are fastened to the inner side of front wall 39 of the treatment tank. The edge portion of belt run 7A slides on the inner side of channel lip 35A and the edge of belt run 8B travels on the inner side of channel lip 36A. At the same time, the edge of belt run 7B slides along the space between the top of channel 35 and the bottom of angle 37 and the edge of belt run 8A moves along the space between channel 36 and angle 38.

Although not shown, shoe 34 and the bearing for the shaft of belt sprocket 13 are also fastened to the inner side of front wall 39 of the tank as illustrated in FIG. 3 for channels 35,36 and angles 37,38. It will be understood that the other belt sprockets 11,12,14,21,22,23 where belts A,B jointly make a turn in their travel will have an associated shoe similar to shoe 34 adjacent sprocket 13. Sprockets 10, 15,20,24,25,26 do not require a shoe and their shafts are supported in bearings fastened to conventional structural members outside of the tank holding liquid bath 33.

Channel 35 and angle 37 extend from close to sprocket 13 to close to sprocket 23 while channel 36 and angle 38 extend from close to sprocket 13 to close to sprocket 14. The guides for belt runs 7A,7B,8A,8B formed by channels 35,36 and angles 37,38 are similarly provided for belt runs 2A,2B,3A,3B,4A,4B, 5A,5B,6A,6B,9A,9B. Fastened to the inner surface of the rear wall of the tank are channels, angles, shoes and bearings for the shafts of belt sprockets 11,12,13,14,21,22,23 like the corresponding elements supported by front wall 39 of the tank as partially shown in FIG. 2 and FIG. 3. Of course, the width of belts A,B is such that the edge portions of these belts opposite the edge portions shown in FIG. 3 as being supported by channels 35,36 and angles 37,38 will likewise be supported by corresponding elements fastened to the inner surface of the rear wall of the tank.

As previously mentioned, one end of each of the shafts of all the belt sprockets shown in FIG. 1 will have a power sprocket or gear mounted thereon so that with their associated power chains or other known power train all of the belt sprockets can be rotated at the same speed by a single electric motor. As for the shafts of belt sprockets 11,12,13,14,21,22,23 which are submerged in liquid bath 33, the end of each of these shafts equipped with a power sprocket may be within bath 33 or may extend through the front or rear wall of the treatment tank so that the power sprockets and associated drive means are not in contact with bath 33. Whether these power sprockets and the drive means therefor are placed within or outside the treatment tank often depends on the type of liquid used in the tank.

FIG. 4 is an edgewise diagrammatic representation of the conveyor of this invention traveling through two different processing zones which are interconnected. Tank 40 having end walls 41,42, bottom 43 and open top 44 is provided with internal wall 45 which divides tank 40 into two zones X,Y filled with the same liquid but at different temperatures as will be explained hereinbelow. Mesh-type conveyor belt A has marginal openings which mesh with the teeth of sprockets 46,47,48,49,50, 51 which rotate counterclockwise at the same speed. Mesh-type conveyor belt B has marginal openings which mesh with the teeth of belt sprockets 52,53,54,55,56,57,58,59 which rotate clockwise at the same speed of sprockets 46,47,48,49,50,51. All of the sprockets except 46,51,52,57 are submerged in the liquid.

As shown, the pass of paired belts A,B traveling from belt sprocket 48 to sprocket 49 goes through slot 60 in dividing wall 45 and thus carries the material held in the conveyor from treatment zone X directly into zone Y. The run of belt B moving from belt sprocket 58 to sprocket 59 goes through narrower slot 61 in wall 45.

There is no need to repeat in detail that each U-turn of the paired belts A,B involves a curved guide or shoe like shoe 34 of FIG. 2 and that the marginal portions of belts A,B move in parallel guides to maintain uniform spacing between belts A,B as illustrated in FIG. 2 and FIG. 3 by channels 35, 36 and angle bars 37,38. Likewise, the drive mechanism for all of the belt sprockets need not be discussed because such a mechanism has been suggested for the conveyor of FIG. 1 and other drive means are known.

An important use of the conveyor and two-zone treating tank of FIG. 4 is the cooking of a pasta product such as ravioli. For example, a continuous sheet of ravioli issuing from a ravioli machine is deposited on belt B as it leaves belt sprocket 52. The ravioli on belt B traveling beyond sprocket 46 become trapped by belt A. The ravioli captured by the paired belts A,B follow a zigzag course through boiling water in zone X. The cooked ravioli leave zone X through slot 60 in wall 45 and continue to be conveyed in another zigzag course in zone Y where chilled water is used to cool the cooked ravioli.

Inasmuch as water is continuously lost by the boiling bath in zone X, make-up water is supplied to zone X from zone Y. For this purpose, the water level in zone Y is maintained slightly higher than that in zone X so that water in zone Y will flow through slots 60,61 into zone X. In turn, fresh cold water is supplied to zone Y to maintain the desired water level therein.

As desirable but not required options, the system of FIG. 4 includes a pair of rectangular containers or chests 62 positioned adjacent wall 45 and on opposite sides of the conveyor pass which goes through slot 60. Chests 62 are supplied with steam or other heating fluid so that cold water flowing from zone Y through slots 60,61 is heated as it enters zone X. Likewise, a pair of rectangular containers 63 may be positioned adjacent wall 45 and on opposite sides of the conveyor pass moving toward belt sprocket 49 in zone Y. Containers 63 may be filled with insulation so that heat stored in the cooked ravioli and conveyor coming from zone X is not dissipated to the water in zone Y but rather is transferred to the cold water flowing from zone Y into zone X. Flexible wiper blades 64 of rubber or plastic are provided on opposite sides of the conveyor pass entering zone Y to restrict the flow of water from zone Y to zone X. Similarly, flexible wiper blades 65 press against the opposite sides of belt B where it goes through slot 61 into zone X.

Figure 5:
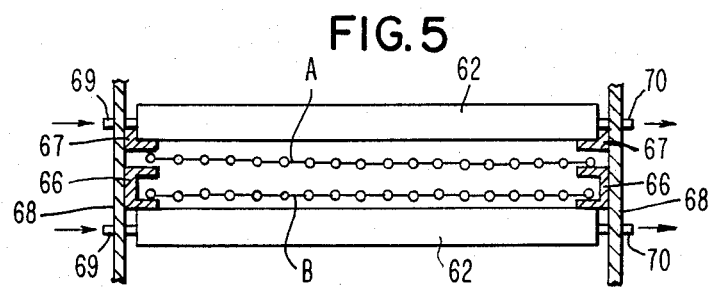
FIG. 5 is an enlarged and more detailed sectional view taken along the line 5—5 of the bottom pass of the conveyor of FIG. 4.

FIG. 5 is an enlarged partial section of the conveyor taken along the line 5—5 of FIG. 4. The marginal portions of belt B slide on the inner surface of the bottom lips of channels 66 while the edges of belt A travel in the spaces between channels 66 and angle bars 67 which are fastened to the inner faces of side walls 68 of the two-zone tank of FIG. 4. Upper steam chest 62 is supported by angles 67 while lower steam chest 62 is fastened to the bottom of channels 66. Each of chests 62 has pipe connector 69 extending through side wall 68 for the introduction of steam and pipe connector 70 extending through opposite side wall 68 for the withdrawal of condensate. Containers 63 are similarly supported in zone Y of the tank but other means for holding chests 62 and containers 63 in the tank will be obvious to engineering designers.

FIG. 6 shows diagrammatically the conveyor of this invention in a vertical chamber 71 having end walls 72,73, bottom 74 and top 75. Reticular belt A is driven by sprockets 76,77,78,79 rotating counterclockwise while reticular belt B is driven by belt sprockets 80,81,82,83,84 rotating clockwise. The upper left corner of chamber 71 has an opening and chute 85 which is used for feeding the material to be processed in chamber 71. The material slides down chute 85 and is caught between belts A,B. A treating gas enters chamber 71 through duct 86, flows upward therein and exits through duct 87. The material undergoing treatment by contact with the gas travels two downward passes from belt sprockets 80,81 and two upward passes from belt sprockets 77,78 until it reaches sprocket 82 where it is released by belts A,B moving in opposite directions. The treated and released material falls on chute 88 which discharges the material from chamber 71 to containers or other desired means for handling the treated material. The entire conveyor system of FIG. 6 is within chamber 71. Depending on the nature of the gas flowing through chamber 71, the drive mechanism for all the belt sprockets 76,77,78,79,80,81,82,83,84 may be designed to be within or outside chamber 71 as already explained in connection with the conveyor of FIG. 1. From the foregoing description, it is obvious that where belts A,B are to be kept in parallel, spaced relation, their edge portions will slide along straight guides like channels 35,36 and angle bars 37,38 and around curved guides like shoe 34 as illustrated in FIG. 2 and FIG. 3.

The three embodiments of the conveyor of this invention illustrated by FIG. 1, FIG. 4 and FIG. 6 have been described as having the straight and curved guides for the belts as well as the bearings for the shafts of the belt sprockets fastened to the inner faces of the two side walls of the tank or chamber in which the material is to be treated. The support structure for the conveyor including the straight and curved guides and shaft bearings can be completely independent of the tank or chamber in which the conveyor is to be used. For example, a pair of upright steel plates held apart by transverse struts can take the place of the tank walls or chamber walls. Such an independent support structure for the conveyor of this invention makes it possible to place the conveyor with its support structure in a plain tank or chamber and to remove it therefrom for cleaning or other servicing whenever desired. An overhead crane or like equipment will be needed to lower the independent conveyor system into the tank and to withdraw it therefrom for servicing. When the independent conveyor system is used in a gas chamber, it may be mounted on a trolley so that it can be rolled into and out of the chamber through a door provided in one wall of the chamber.

An independent conveyor system for FIG. 4 would include dividing wall 45, steam chests 62 and insulation containers 63; that is, these components would be lifted out of the tank together with the conveyor when it required servicing. In the case of FIG. 1, an independent conveyor system would make it necessary to disconnect belt B, for example, in run 2B near sprocket 20 and in run 9B near sprocket 24, before lifting the conveyor system out of the tank because belt B has run 18 extending under bottom 31 of the tank.

When the conveyor has an independent support structure, the power sprockets and associated drive mechanism will necessarily be immersed in the liquid bath of a tank or be exposed to the gas of a treating chamber.

Besides the numerous uses of the novel conveyor, such as for frying potatoes, smoking frankfurters, conditioning tobacco or retorting canned food, those skilled in the art will visualize many variations and modifications of the invention without departing from the spirit or scope of the invention of which only three embodiments have been described hereinbefore. For example, by reversing the rotation of all the belt sprockets of FIG. 1, material placed on belt run 1 would be carried to position 28 where it would be captured between belt runs 9A,9B moving vertically into the liquid bath. The treated material would then be discharged at position 27. Similarly, the gas treating chamber 71 of FIG. 6 could be placed on side 72 and by reversing the rotation of all the belt sprockets, chute 88 would serve for feeding material to the conveyor and chute 85 would discharge the treated material from chamber 71.

As another variation of the invention, return runs 16,17,18 of belt B may be replaced by runs 16',17' shown by dotted lines in FIG. 1. Belt sprockets 20',20" will then replace sprocket 20, sprocket 24' will replace sprocket 24 and sprockets 25,26 will be eliminated. Belt run 17' is high enough above belt run 1 that the material to be treated can be easily supplied to the conveyor at position 27 and removed at position 28. While sprockets 20,24,25,26 are rotated clockwise, substitute sprockets 20',20",24' will be rotated counterclockwise.

Obviously, the up-and-down zigzag path of the conveyor shown in FIG. 6 can also be used in a liquid bath. If such a vertical arrangement would be applied to the two-zone tank of FIG. 4, it would be possible to have dividing wall 45 without slots 60,61 by having the last upward pass of the conveyor in zone X adjacent wall 45 travel around a belt sprocket positioned above the top of wall 45 so that the next downward pass of the conveyor enters zone Y adjacent the other side of wall 45. This arrangement is desirable when different liquids are used in zones X and Y. Accordingly, only such limitations should be imposed on the scope of the invention as are set forth in the appended claims.

What is claimed is:

1. A conveyor with a zigzag travel path with at least one U-turn which comprises a pair of flexible continuous conveyor belts, each said belt having openings along both of its marginal portions, a set of driven belt sprockets for each said belt meshing therewith through said openings, part of the lengths of said belts moving in the same direction with their marginal portions supported by straight guides leading to and away from each said U-turn in said zigzag path to maintain said belts with a substantially uniform spacing therebetween, a pair of said sprockets positioned at each said U-turn to mesh with said openings of one of said belts, a pair of arcked guides fixed at each said U-turn so that the marginal portions of the other of said belts have sliding support around said arced guides to maintain said substantially uniform spacing between said belts around each said U-turn, and the remaining part of the lengths of said belts being maintained apart from one another to provide a place for feeding material to said conveyor near where said belts begin to move with said substantially uniform spacing therebetween and a place for discharging said material from said conveyor after said belts begin to move apart.

2. The conveyor of claim 1 wherein the driven belt sprockets of the set for one of the two belts rotate clockwise and the driven belt sprockets of the set for the other of said belts rotate counterclockwise.

3. The conveyor of claim 1 wherein the two belts are metal mesh.

4. The conveyor of claim 1 wherein the two belts are reticular and the zigzag path is disposed in a container filled with a treating fluid.

5. The conveyor of claim 4 wherein the arcked guides are made of plastic, the driven belt sprockets of the set for one of the two belts rotate clockwise and the driven belt sprockets of the set for the other of said belts rotate counterclockwise.

6. The conveyor of claim 4 wherein the container has a dividing wall to provide two zones therein filled with the same treating fluid, and the zigzag path extends from one of said zones through a slot in said dividing wall into the other of said zones.

7. The conveyor of claim 6 wherein two flat elongate heat exchangers are disposed contiguous to the dividing wall and on opposite sides of the zigzag path where said path extends through the slot in said dividing wall.

8. A conveyor with a zigzag travel path which comprises a pair of flexible continuous conveyor belts, each said belt having openings along both marginal portions, a set of driven belt sprockets for each said belt meshing with its said openings, part of the lengths of said belts being arranged to move in the same direction with a substantially uniform spacing therebetween along said zigzag path having several straight conveyor passes connected by U-turns, along each said conveyor pass straight guides positioned to provide sliding support for said marginal portions of said belts and to maintain said uniform spacing therebetween, at each of said U-turns one of said belts turning with its said openings meshing a pair of its said belt sprockets and the other of said belts turning with its said marginal portions sliding around a pair of arcked guides positioned to maintain said uniform spacing between said belts around each of said U-turns, and the remaining part of the lengths of said belts being arranged to move away from one another to provide a place for feeding material to said conveyor before the start of the first of said conveyor passes and a place for removing said material from said conveyor after the end of the last of said conveyor passes.

9. The conveyor of claim 8 wherein the two belts are reticular, the zigzag path is disposed in a container filled with a treating fluid, and the places for feeding material to, and for removing material from, said conveyor are outside said container.

10. The conveyor of claim 9 wherein the two belts are metal mesh and the arcked guides are made of plastic.

11. The conveyor of claim 8 wherein all of the driven belt sprockets at U-turns on which one of the two belts turns are rotated clockwise, and all of the driven belt sprockets at U-turns on which the other of said two belts turns are rotated counterclockwise.

12. The conveyor of claim 11 wherein the two belts are reticular, the zigzag path is disposed in a tank containing a liquid bath, and the places for feeding material to, and removing material from, said conveyor are outside said liquid bath.

13. The conveyor of claim 12 wherein the tank has a dividing wall to form two zones in the liquid bath, and the zigzag path has a straight pass extending from one of said zones through a slot in said dividing wall into the other of said zones.

14. The conveyor of claim 13 wherein two flat elongate heat exchangers are disposed contiguous to the dividing wall and on opposite sides of the straight pass which extends through the slot in said dividing wall.

15. The conveyor of claim 13 wherein two flexible wiper blades are disposed to contact the opposite sides of the straight pass which extends through the slot in the dividing wall so that flow between the two zones of the liquid bath is restricted.

16. The method of treating a material by passage through a body of treating fluid which comprises capturing said material between two flexible continuous conveyor belts as said belts are moving closer together into a substantially uniformly spaced relation to one another, conveying said captured material as said belts move along a zigzag path within said body of treating fluid while maintaining said belts in said uniformly spaced relation, and releasing said material as said belts move out of said body of treating fluid and out of said uniformly spaced relation.

17. The method of treating a material according to claim 16 wherein the body of treating fluid is a liquid bath having two zones maintained at different temperatures.

18. The method of treating a material according to claim 17 wherein the liquid bath is water and one zone of said bath is maintained in boiling condition.

19. The method of treating a material according to claim 18 wherein the material is a pasta product which is carried along the zigzag path first through the zone maintained at boiling condition and then through the other zone where cold water is added as make-up for water lost by evaporation from said zone maintained at boiling condition.

* * * * *